(12) United States Patent
Hartman et al.

(10) Patent No.: US 8,434,004 B2
(45) Date of Patent: Apr. 30, 2013

(54) REPRESENTATIONS OF COMMUNICATIONS SESSIONS IN VIRTUAL ENVIRONMENTS

(75) Inventors: Michael Hartman, Galway (IE); Tony McCormack, Galway (IE); Neil O'Connor, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 380 days.

(21) Appl. No.: 12/739,345

(22) PCT Filed: Oct. 20, 2008

(86) PCT No.: PCT/EP2008/008859
§ 371 (c)(1),
(2), (4) Date: Apr. 22, 2010

(87) PCT Pub. No.: WO2009/053015
PCT Pub. Date: Apr. 30, 2009

(65) Prior Publication Data
US 2010/0313147 A1    Dec. 9, 2010

(30) Foreign Application Priority Data
Oct. 22, 2007   (GB) .................................. 0720600.6

(51) Int. Cl.
*G06F 3/048* (2006.01)
(52) U.S. Cl.
USPC .......................................... 715/706; 715/757
(58) Field of Classification Search .................. 715/706, 715/757, 705
See application file for complete search history.

(56) References Cited

U.S. PATENT DOCUMENTS

| | | | |
|---|---|---|---|
| 6,910,186 B2 * | 6/2005 | Kim .............................. | 715/706 |
| 7,426,467 B2 * | 9/2008 | Nashida et al. ............... | 704/275 |
| 8,078,698 B2 * | 12/2011 | Moore .......................... | 709/220 |
| 2006/0111189 A1 | 5/2006 | Winkler | |
| 2007/0087822 A1 * | 4/2007 | Van Luchene .................. | 463/25 |
| 2007/0203828 A1 | 8/2007 | Jung et al. | |
| 2008/0303811 A1 * | 12/2008 | Van Luchene ................ | 345/419 |

OTHER PUBLICATIONS

Form PCT/ISA/210, "International Search Report" for PCT/EP/2008/008859, mailed Apr. 17, 2009 (3 pages).
Form PCT/ISA/237, "Written Opinion of the International Searching Authority," for PCT/EP/2008/008859, mailed Apr. 17, 2009 (8 pages).

* cited by examiner

*Primary Examiner* — Omar Abdul-Ali
(74) *Attorney, Agent, or Firm* — Maldjian Law Group LLC; John P. Maldjian, Esq.; Alexander D. Walter, Esq.

(57) ABSTRACT

A method of representing communications sessions in a virtual environment employs a presentation entity which is provided at a location in the environment where it will be visible and/or audible from the observation point of a user with whom a communications session has been requested. The presentation entity, which can represent a character or an object in the environment, for example, presents information to the user from within the environment. Also disclosed is an automated inhabitant which can operated to interact with other inhabitants of such an environment, obtaining information which is passed to and used by a contact center to queue contacts between such other inhabitants and contact center agents.

22 Claims, 4 Drawing Sheets

REPRESENTATIONS OF COMMUNICATIONS SESSIONS IN VIRTUAL ENVIRONMENTS

TECHNICAL FIELD

This invention relates to the representation of communications sessions within virtual environments. The invention has particular application in integrating contact centers and the resources of such contact centers with virtual environments such as games and alternate worlds, but has further application in integrating other communications, not involving contact centers, in such virtual environments.

BACKGROUND ART

Commonly assigned U.S. patent application Ser. No. 11/608,475 discloses the provision of a link between an online multiplayer game and a contact center. A mechanism is provided in the game which can be activated by a player of the game, and upon activation, a communications channel is opened from the game to an agent of the contact center. The player can thus remain in the game and can communicate from the game environment to the contact center.

The present invention provides improvements in communications in online virtual environments, including but not limited to online games and with particular application to but not limited to communications between contact center resources and inhabitants of such virtual environments.

DISCLOSURE OF THE INVENTION

The invention provides a method of representing a communications session in a virtual environment implemented in a server computer system. The method involves the steps of:
  a) the server computer system providing access to the virtual environment to a user employing a user computer system whereby an observation point into the virtual environment at a current location is provided to the user computer system;
  b) receiving at the server computer system a notification of a request for a communications session with the user;
  c) the server computer system generating a presentation entity, the presentation entity being visible and/or audible within the virtual environment and having the ability to present to the user information regarding the request for the communications session;
  d) providing the presentation entity at a location within the virtual environment where the presentation entity is visible and/or audible to the user's observation point; and
  e) controlling the presentation entity to present to the user information regarding the request for the communications session.

The method provides an additional channel for notifying a user of a virtual environment that there is a communications session intended for that user. Rather than simply having a screen pop-up or a globally available sound, the presentation entity is inserted into the virtual environment itself at a location where it can be seen and/or heard from the user's observation point into that environment.

The method will preferably further involve the step of making available, to the presentation entity, data relating to the request for the communications session.

In preferred embodiments, step (e) involves executing a script specifying responses to be made by the presentation entity in response to inputs received from the user.

Thus, the presentation entity can provide an interactive experience for the user, allowing the user to respond to the information presented regarding the request for a communications session, and allowing the entity to respond appropriately to the inputs received from the user. Again this provides a far richer experience to a user, and allows the user to learn more about the pending request without having to disengage from the virtual environment in which he or she is immersed.

In a preferred option, the observation point is based on a screen view, and the presentation entity is controlled to simulate an ability to interaction directly with a physical screen employed by the user.

In the context of the dramatic arts, there is a concept known as the "fourth wall", which is the imaginary invisible wall at the front of the stage in a theater, through which the audience sees the action in the world of the play. The same term has been used in television, cinema and indeed in video games. By directly addressing the audience, one is said to be "breaking the fourth wall", and it is this effect that is achieved by having the presentation entity simulate an interaction with the physical computer screen of the user, such as by knocking on the "glass" of the screen, or by climbing up it, for example. Thus, the presentation entity is presented in the observation field of the user, but breaks through this to directly address the user in front of the computer screen, with the result that the user becomes more directly aware of the presentation entity.

Preferably, the presentation is controlled to provide an option for the user to accept or reject the communications session.

Such an option can be exercised by speaking to the presentation entity, by an action or gesture, by interacting with the person or object of the prensetation entity, or by a command directed to the virtual environment itself.

The method can further involve the step of notifying the acceptance or rejection of the communications session by the user to a communications system having control of the communications session.

The invention also provides a computer program product involving a data carrier having encoded thereon machine readable instructions which when executed in a server computer system are effective to cause the server computer system to:
  a) provide access to a virtual environment to a user employing a user computer system whereby an observation point into the virtual environment at a current location is provided to the user computer system;
  b) upon receiving a notification of a request for a communications session with the user, generate a presentation entity, the presentation entity being visible and/or audible within the virtual environment and having the ability to present to the user information regarding the request for the communications session;
  c) provide the presentation entity at a location within the virtual environment where the presentation entity is visible and/or audible to the user's observation point; and
  d) control the presentation entity to present to the user information regarding the request for the communications session.

Furthermore, there is provided a server computer system operating a computer program thereon which causes the server computer system to:
  a) provide access to a virtual environment to a user employing a user computer system whereby an observation point into the virtual environment at a current location is provided to the user computer system;
  b) upon receiving a notification of a request for a communications session with the user, generate a presentation entity, the presentation entity being visible and/or audible within the virtual environment and having the ability to present to the user information regarding the request for the communications session;

c) provide the presentation entity at a location within the virtual environment where the presentation entity is visible and/or audible to the user's observation point; and d) control the presentation entity to present to the user information regarding the request for the communications session.

In another aspect the invention provides a method of operating a system involving a virtual environment implemented in a computerized system and a contact center having an interface with the virtual environment, the method involving the steps of:

a) generating within the virtual environment an automated inhabitant associated with the contact center;

b) controlling the automated inhabitant with an automated program causing the automated inhabitant to operate at least part of the time in a contact mode of operation;

wherein the contact mode of operation comprises:
   (i) controlling the automated inhabitant to interact with another inhabitant of the virtual environment,
   (ii) capturing information from the interaction; and
   (iii) forwarding the captured information to the contact center;

whereby the contact center may direct a contact relating to the interaction to a resource of the contact center based at least in part on the captured information.

While automated inhabitants of virtual worlds are well known generally, this method provides more than a simple scripted character. The automated inhabitant conducts an interaction, captures information, and then forwards this information to a contact center. In this way, the contact center effectively employs the automated inhabitant to conduct an outbound campaign, and to collect useful information which the contact center can then employ in its subsequent treatment of interaction with the inhabitant, such as by allocating an appropriately trained agent to handle this contact in advance.

Preferably, this method further involves the step of queuing, in a queuing system of the contact center, a contact relating to the interaction, the queuing being based at least in part on a decision made on the basis of the captured information.

Contact centers which conduct outbound campaigns may typically experience a low positive response rate. This means that human agents can spend a lot of time calling numerous numbers, at a relatively poor rate of return. By using an automated inhabitant to glean information (such as the interests of a user of the virtual environment), the most promising of these leads can be identified in advance and queued to an appropriate resource, all without requiring human intervention. Thus, human agent time can be directed to speaking further with those virtual world inhabitants who have been identified as showing an interest by the automated interaction.

Preferably, steps (ii) and (iii) of the contact mode of operation are repeated during the course of the interaction, whereby the direction of the contact to a resource may be modified on the basis of updated information.

Typically, the contact will be continually or repeatedly updated with each piece of new relevant information learnt during the interaction, which can assist in refining the queuing of the contact.

The method may further involve the step of transferring control of the automated inhabitant to the resource of the contact center.

Optionally, the method further involves the step of notifying the other inhabitant of the transfer of control.

Thus, an agent or an application (such as an interactive voice response application or an automated helpdesk) of the contact center can assume control of the automated inhabitant. This transfer of control can appear seamless to the user involved in the interaction, or it can be flagged, either for regulatory reasons, or to show the customer that a "live" agent has taken over.

Preferably, the method further involves the steps, carried out at the contact center, of:

c) receiving an indication of the interaction;
d) creating a contact relating to the interaction;
e) receiving the information captured from the interaction; and
f) directing the contact to a resource of the contact center based at least in part on the information.

In a further refinement, the virtual environment is configured to provide a benefit to an inhabitant thereof when the inhabitant interacts with the environment in a defined manner, and wherein the step (b) of controlling the automated inhabitant with an automated program further causes the automated inhabitant to operate at least part of the time in an acquisition mode of operation;

wherein the acquisition mode of operation comprises:
   (i) controlling the automated inhabitant to interact with the virtual environment in the defined manner in order to acquire the benefit;

whereby the contact center may employ the automated inhabitant to acquire a benefit from the virtual environment when the automated inhabitant is operating in the acquisition mode.

Thus, the automated inhabitant can, in addition to operating in a contact mode as explained above, find "gainful employment" within the virtual environment by accruing some benefit made available from the environment, such as game money, game experience, the manufacture of artifacts, and so on. Such benefits may have a real world value which can accrue to the contact center, or to an agent of the contact center, or such benefits may provide additional inherent value to the automated inhabitant, which in turn may acquire a real world value.

Preferably, the contact center is operable to switch the automated inhabitant between the contact mode and the acquisition mode based on an activity level of the contact center.

More preferably, the automated inhabitant is operated in the acquisition mode when a resource of the contact center is operating above a defined activity threshold.

In this way, the contact center can optimise the activity of the automated inhabitants under its control, helping out with generating contacts (in the contact mode of operation) when this is appropriate to the overall current activity level of the contact center or the activitity level of an agent or group of agents, or helping to acquire a benefit to the contact center (in the acquisition mode of operation) when the activity levels of the contact center would not benefit from the automated inhabitant operating in the contact mode of operation.

The decision to pursue one or other mode of operation can be influenced by other factors, including a comparative analysis between the benefit available from the respective modes of operation.

The decision can be as simple, in fact as the personal decision of an agent who might benefit more from one or other mode of operation, particularly in cases where the agent is a freelance agent who can choose when to respond to contacts and when (for example) to be unavailable and simply play a game instead.

Optionally, therefore, the automated inhabitant may be associated with a human agent of the contact center and the mode of operation of the automated inhabitant is selected based on the actions of the human agent.

The actions of the human agent can include actions selected by the human agent to directly control the mode of operation of the automated inhabitant.

The actions of the human agent can additionally or alternatively include actions performed by the human agent in relation to normal activities of the contact center, wherein the actions are monitored to automatically control the mode of operation of the automated inhabitant in response thereto.

When the automated inhabitant is associated with a human agent of the contact center, the benefit acquired by the automated inhabitant may be measured to evaluate a benefit accruing to the human agent.

Thus, the agent may be placed on a bonus scheme, particularly in cases where the benefit acquired by the automated inhabitant has some value to the contact center. One can foresee individual agents being placed in charge of a number of automated inhabitants and being allowed to decide how the mode of operation of each such agent should be controlled. Agents could use their judgement based on the location of each automated inhabitant, the time of day, and their knowledge of the benefit acquisition rules, to optimise their bonus while disposing of optimal numbers of contacts.

The invention also provides a computer program product involving a data carrier having encoded thereon machine readable instructions which, when executed in a computerized system involving a virtual environment and a contact center having an interface with the virtual environment, cause the computerized system to:
  a) generate within the virtual environment an automated inhabitant associated with the contact center;
  b) control the automated inhabitant with an automated program causing the automated inhabitant to operate at least part of the time in a contact mode of operation;
  wherein the contact mode of operation comprises:
    (i) controlling the automated inhabitant to interact with another inhabitant of the virtual environment,
    (ii) capturing information from the interaction; and
    (iii) forwarding the captured information to the contact center;
  whereby the contact center may direct a contact relating to the interaction to a resource of the contact center based at least in part on the captured information.

The invention further provides a computerized system controlling a virtual environment and including a contact center having an interface with the virtual environment, the computerized system operating a computer program thereon which causes the server computer system to:
  a) generate within the virtual environment an automated inhabitant associated with the contact center;
  b) control the automated inhabitant with an automated program causing the automated inhabitant to operate at least part of the time in a contact mode of operation;
  wherein the contact mode of operation comprises:
    (i) controlling the automated inhabitant to interact with another inhabitant of the virtual environment,
    (ii) capturing information from the interaction; and
    (iii) forwarding the captured information to the contact center;
  whereby the contact center may direct a contact relating to the interaction to a resource of the contact center based at least in part on the captured information.

DETAILED DESCRIPTION OF PREFERRED EMBODIMENTS

Figure 1:
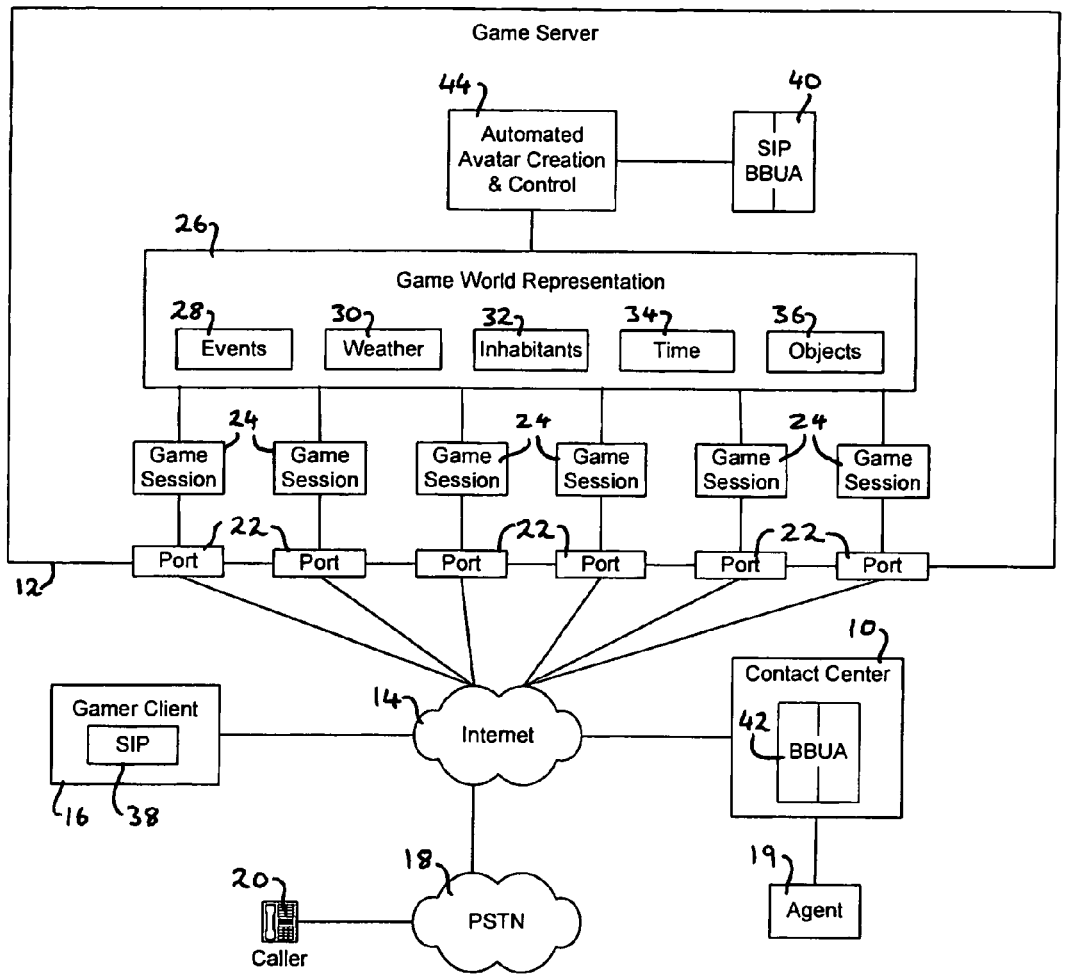
FIG. 1 is an architecture of a system comprising a game server in communication with a network.

FIG. 1 is a simplified architecture of a system providing integration between a contact center, indicated generally at 10, and a virtual environment, represented by a game server 12. In FIG. 1, the connections shown are logical connections and details of networks connecting the various entities are omitted for increased clarity. It will be understood that the various connections can be implemented over various wired and wireless networks, including local area networks and wide area networks, such as the Internet, and that parts of the system may be implemented in an integrated computer application running on a single computer.

FIG. 1 is a simplified architecture of a system comprising a contact center 10 and a game server 12 connected via the Internet 14. Also connected to the Internet 14 are a gamer client system 16 and the public switched telephone network 18, accessible by a caller 20 using a telephone. There will of course be an enormous number of potential callers connected to the PSTN 18, just as there are normally a multitude of garners accessing a game server via the Internet at any one time. Similarly, a single agent 19 is shown connected to the contact center but there will usually be a large number of agents logged in to a contact center at any given time.

The gamer 16 uses a computer system operating a client program, which connects to a port 22 of the game server 12. A typical game server will expose one or more ports which can receive hundreds or thousands of connections from a different gamer client system. For each such connected client, the game server may operate a game session 24 which interacts with the client 16 in order to receive inputs from the gamer controlling the client 16 and in order to provide to the client 16 game data which the client 16 can render as a coherent game world on the gamer's computer system. In reality, these "sessions" shown as running on the server may only be virtual sessions, and it is likely that relatively very few actual sessions exist at any given time on the server. The sessions are more likely to be persisted at the clients, and sent to the server on any client state change to be updated at the server with merged information from adjacent clients' sessions, and sent back to the client for rendering.

From the point of view of the gamer, the game client provides control of a character (or avatar or inhabitant) having a presence within an extensive virtual environment. It should be noted in passing that the system described in FIG. 1 is a game environment, but the invention is not limited to game environments and is applicable to other virtual environments in which a user of the system is provided with an observation point based on a current assigned location. The user has access into the environment visually and/or audibly from this observation point.

The observation point may be based on more than one actual location in the virtual environment. For example, characters in the environment may have multiple embodiments, each with a distinct location; a magical character or a might have a "familiar" such as an animal, or may be able to cast a spell, through which the player of the character gains access visually and/or audibly into the environment from an additional observation point; or characters may have technological means of observing the environment from multiple locations.

Accordingly, the client controls a character to interact with a world which is rendered on the screen of the computer system using commands and an interface. Such inputs are interpreted by the game session 24 and are passed to an engine which controls an objective game world representation 26. The game world representation controls the current state of every aspect of the game world, including events occurring within the world 28, weather at different locations 30, the state of each of the inhabitants 32 of the game world, including the inhabitant controlled by client 16, the time within the game world 34, and the many thousands of objects 36 within the game world environment. As the inhabitant controlled by client 16 interacts with the world and with the other inhabitants, the state of the world will be changed, as it will similarly be changed by events occurring elsewhere, the actions of other inhabitants, the passage of time, and the interaction of objects with other objects.

For each of the game session which is currently in operation, that portion of the game world which is visible and audible to the observation point provided by the current location represented within the respective connected client system is represented by the game session 24.

It will be appreciated that the preceding explanation is a highly simplified version of what can be a very complex virtual environment.

The system as described thus far is entirely conventional, and the skilled person will be aware of many variations and modifications to how such systems may be implemented in practice.

The game server 12 provides, in addition to the normal game functions, an ability for communications sessions to be initiated with the gamer, for example with a session initiation protocol user agent (SIP UA) which is running on the gamer's computer system and which may be integrated within the client 16.

As the skilled person will know, a SIP UA is a software entity which can take part in communications sessions (acting as a "user agent client" or a "user agent server", depending on whether it is initiating or responding to a request) using the session initiation protocol based on the IETF specification RFC 3261.

The game server 12 provides SIP capabilities with an integrated back-to-back user agent (commonly referred to using the acronyms BBUA or B2BUA) 40. The BBUA is also defined in the IETF standard RFC 3261, and is effectively a concatenation of a SIP user agent server and a SIP user agent client. More particularly, the BBUA is a logical entity that receives a request and processes it as a user agent server (UAS). In order to determine how the request should be answered, it acts as a user agent client (UAC) and generates requests. Unlike a proxy server, it maintains dialog state and must participate in all requests sent on the dialogs it has established.

The user agent server component of the BBUA 40 thus handles messages on behalf of the users of the game server, such as SIP INVITE messages received from another source and identifying a user of a game client with whom a connection is requested.

The SIP invite message may be received from a corresponding BBUA 42 in contact center 10, or it may be received from a SIP user agent of another gamer (who might, for example, know the identity of the avatar controlled by gamer client 16 but may not have the SIP address of the gamer), or it may be received from caller 20 via PSTN 18 which interfaces with the Internet 14 by a gateway (not shown), or indeed it may even be received from a software application also running on the game server or on another server associated with the game (such as an automated marketing application which is written to contact users within the game with automated communications scripts).

Instead of, or in addition to, presenting the communications session to the gamer by more conventional means, such as by a telephone ringing, or a SIP client such as SIP client 38 providing a screen pop-up, the game server 12 provides a notification by representing the communications session within the game itself.

To do this, SIP BBUA communicates with a software component responsible for the creation and control of automated avatars 44. Preferably, for each communications session intended for a user of the game server 12, automated avatar creation and control component 44 will generate an automated avatar which is scripted to present, from within the virtual environment, the existence of the communications session. The SIP BBUA can populate the automated avatar with data relating to the received communications session request, or program the script with a pointer to where the information can be accessed. The automated avatar thus created is inserted into the virtual environment of the game world, where it is treated like any of the other inhabitants whose state is monitored by the inhabitants component 32. As an alternative to creating an avatar, the avatar may already exist in the game world, in which case it is simply selected and moved to the correct location, or it may have been created earlier and logged out, in which case it can be logged back into the game.

Based on the current location of the avatar under the control of gamer client 16, the automated avatar is inserted into the virtual environment at a point where it will be visible and/or audible to the user of client 16, or at a nearby point where it can travel to the vicinity of the gamer client 16. The automated avatar is scripted to interact with the user 16 in an appropriate manner to inform the user 16 of the existence of the communications session. Typically, the avatar will be created and scripted to be consistent with the environment. Thus, if the avatar controlled by the client is in a virtual hotel lobby, the automated avatar representing the communications session might be embodied as a hotel bellboy wandering through the lobby and calling the name of the gamer's avatar. If the gamer's avatar, on the other hand, is flying in a hot air balloon, the automated avatar might be embodied as a carrier pigeon landing in the balloon and presenting a written message. In a futuristic environment, an automated drone might appear to present the communications session. The sophistication of the behaviour of the presentation entity, and the form which the presentation entity can assume, are limited only by the imagination of the designers of the game system and the constraints of the system itself.

The automated avatar need not even interact with the gamer's avatar at all. The automated avatar could, for example, walk right up to the observation point inhabited by the gamer and "knock on the glass" representing the gamer's screen, as though it were a messenger inside the gamer's computer system. In appropriate circumstances, the automated avatar might even represent a pushy salesman and might chase an unwilling gamer avatar down the street in order to make its pitch.

Having been presented with and informed of the details of the communications session intended for the gamer, the gamer can make a decision as to whether or not to accept the communications session. A mechanism might be provided for interacting with the automated avatar to accept or reject the session, or the gamer may be required to call up the SIP client 38 and interact with that in order to accept or reject the request.

The communications session request can be timed according to a schedule (for example, during outcall type scenarios) or according to some time attribute, for example, the presentation entity cannot be generated out of hours. This provides the possibility of implementing call center features such as night-service, outcall schedule adherence (which is legislated for in several places: e.g. do not call during defined meal times), and scheduled call-backs. The generation of the presentation entity can be restricted according to such time-based rules, or the communications session itself can be restricted, if issuing from the contact center, according to the rules of the contact center.

Figure 2:
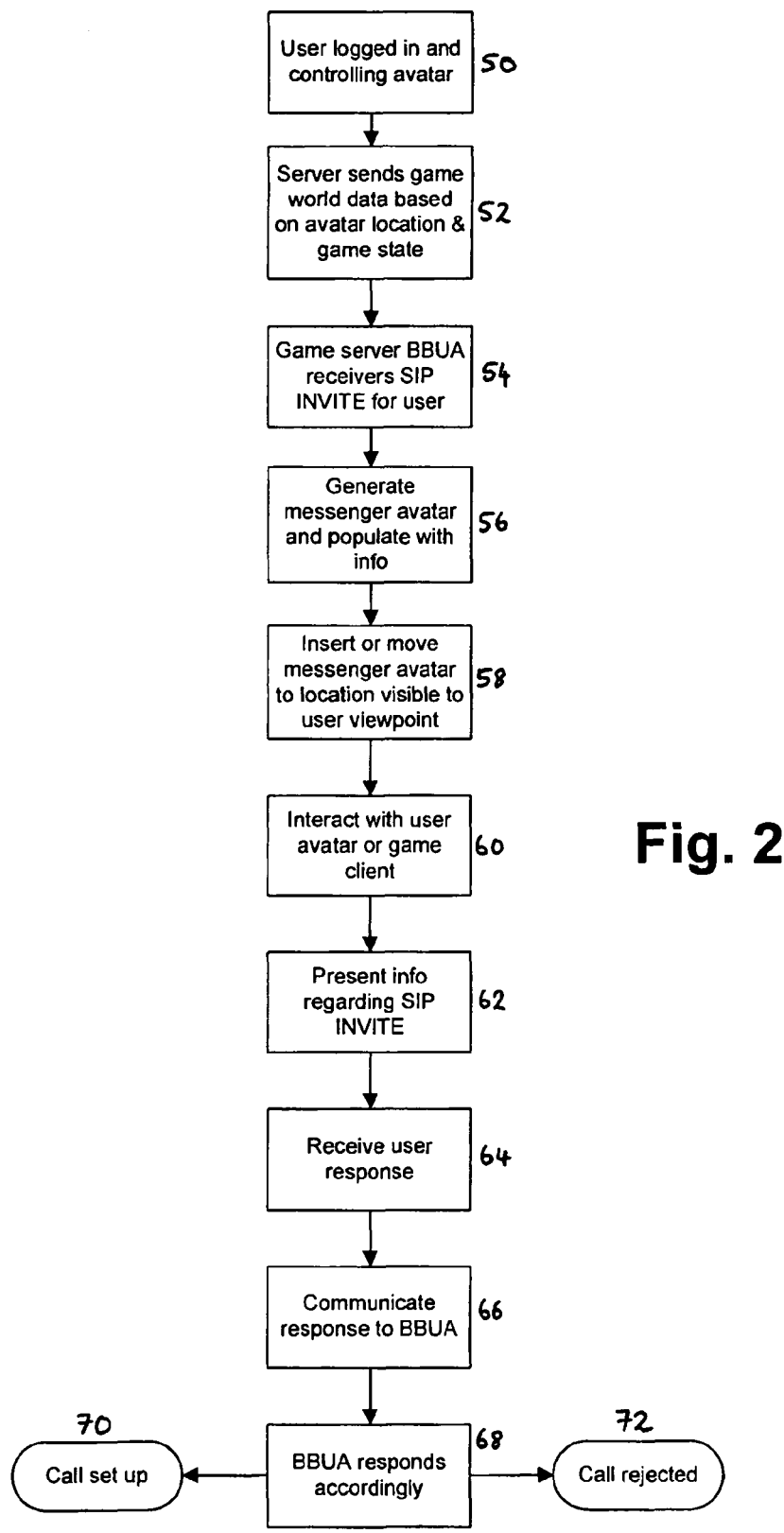
FIG. 2 is a flowchart of a method of representing a communications session in a virtual environment.

Referring now to FIG. 2, a flowchart is provided to illustrate the method in more detail.

In step 50, the user (or gamer) is logged into the virtual environment and is controlling his or her avatar. As described previously, while this occurs, the server sends game world data to be rendered on the computer system of the user based on the location of his or her avatar and on the state of the game world, step 52.

When the BBUA which is integrated within the game server receives a SIP invite and has determined that it is intended for the user in question, step 54, it interacts with the software component 44 to generate a messenger avatar and populates that messenger avatar with information, step 56. The messenger avatar is inserted into the virtual environment or moved to a location in the virtual environment where it is visible to the user from the observation point currently provided into the virtual environment to that user, step 58.

The automated avatar is programmed to interact with the user avatar or with the game client of the user (e.g. knocking on the screen) step 60, and in this way presents information regarding the received SIP invite message, step 62.

As indicated previously, the user may respond within the context of the virtual environment or outside of it. Assuming that the response is within the context of the virtual environment, the gamer server will receive a user response 64, this will be communicated to the BBUA, step 66, and the BBUA will issue a response to the source of the SIP invite accordingly, step 68.

If the user has decided to accept the communications session, then the SIP BBUA 40 of the game server will provide details of the communications session to the SIP client 28 on the gamer's computer system allowing that SIPP client to be connected directly to the originating source, such as agent 19 or caller 20, step 70. If, on the other hand, the user opts not to participate in the requested communications session, then the BBUA will issue a response indicating that the session request has been rejected, step 72.

Figure 3:
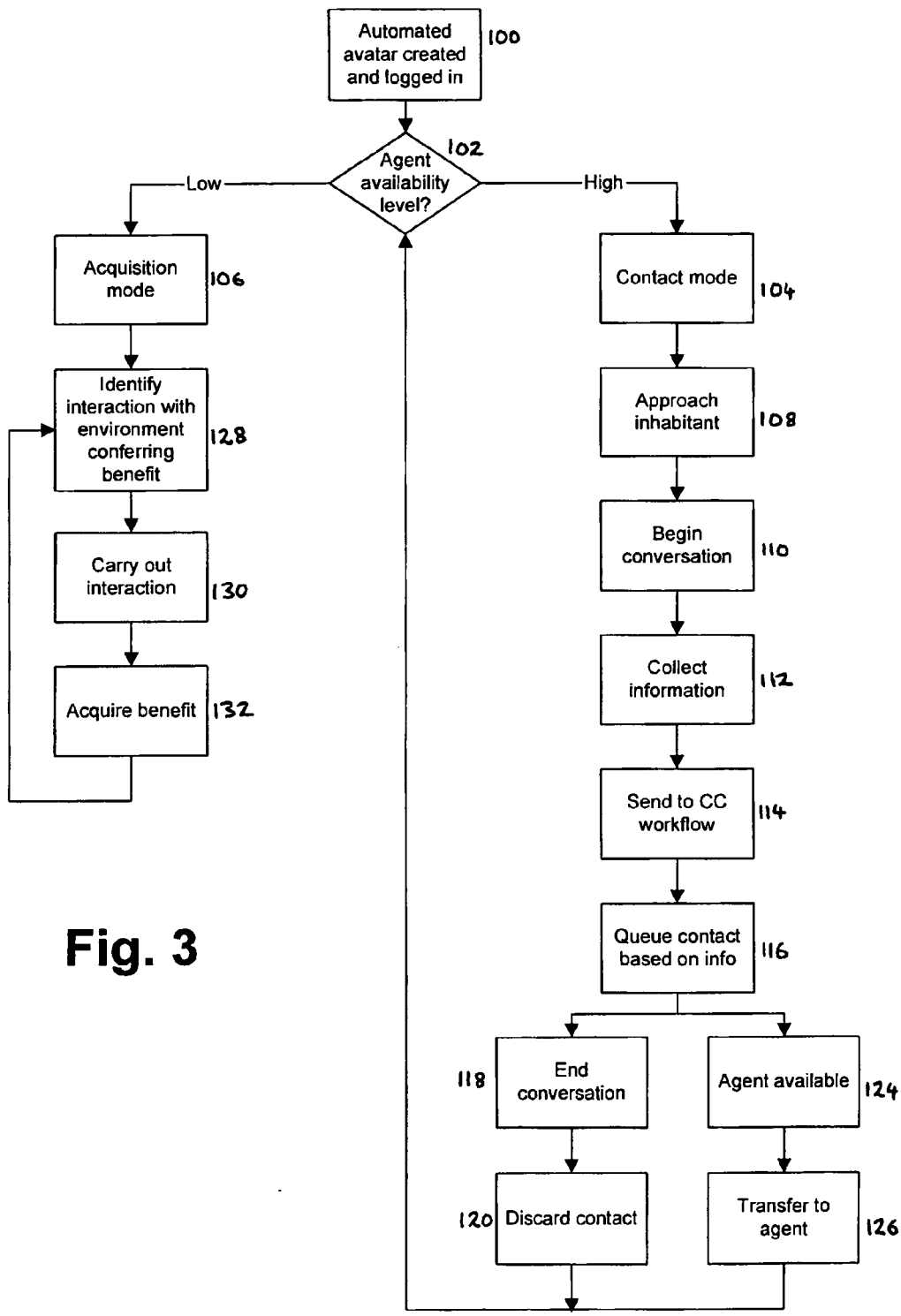
FIG. 3 is a flowchart of a method of operating an automated inhabitant of a virtual environment under the control of a contact center.

Referring now to FIG. 3, an alternative use is provided for automated avatars. Briefly, the automated avatar is under the control of contact©center 10 (FIG. 1) and operates in one of two modes. When in a contact mode, which is the primary mode of operation of the automated avatar, the automated avatar is programmed to move within the virtual environment, contacting inhabitants of that environment as an automated rich media session of the contact center, i.e. carrying out surveys, making sales pitches, or offering assistance, to give but three examples. The interactions of the automated avatar with inhabitants of the virtual environment are monitored for relevant information, and this information is used to queue a contact relating to the inhabitant with whom the interaction is occurring. In this way, a contact may be queued to an appropriate resource of a contact center, including a live agent if needed at any stage during the conversation.

In an alternate mode of operation, referred to as the acquisition mode, the automated avatar can be put to work on behalf of contact center within the context of the virtual environment. This assumes that the virtual environment provides some benefit to its inhabitants when they interact with the environment (which, in the context of this embodiment, is deemed to include interaction with other inhabitants or other automated avatars) in a predetermined way. The benefit may be experience which is gained by an avatar in order to increase the level or abilities of that avatar, or it may be a resource of the virtual world, such as in-game money or commodities which can be collected or mined or farmed, such commodities typically having a value in an economy of the virtual environment.

Assuming that it is legitimate within the rules of the virtual environment for an automated avatar to receive a benefit based on such an interaction, the automated avatar may be placed in acquisition mode when it is more advantageous for the automated avatar to acquire such benefit than it is for the automated avatar to interact with inhabitants.

Accordingly, referring to FIG. 3, an automated avatar is created and logged in. The automated avatar may be created by a software component similar to software component 44 which has previously been described. Typically however, the automated avatar will be provided with scripts for interaction with inhabitants of the virtual environment according to a design provided by the operators of the contact center. The automated avatar is therefore a representation of a rich media session designed by the contact center operator.

Figure 4:
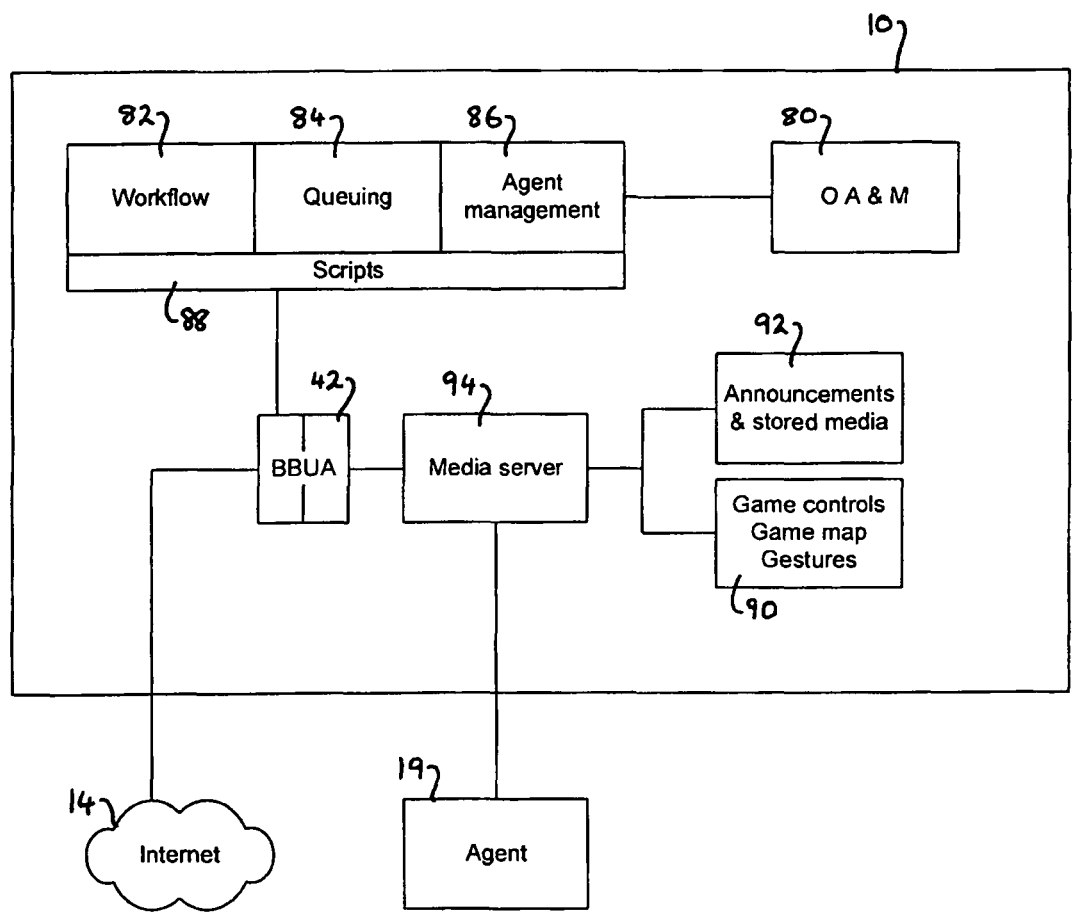
FIG. 4 is a detailed view of the functional components of the contact center.

FIG. 4 provides a more detailed view of the functional components of the contact center 10. Thus, in addition to BBUA 42, the contact center 10 provides controlling services, including operations, administration and management 80, a workflow component 82, a queuing component 84, and an agent management component 86. Workflow queuing and agent management are controlled by a collection of scripts 88. The scripts 88 embody the program and rules laid down by the designer of the contact center to efficiently handle all types of contacts, which in this case include the programming rules for operating the automated avatar.

Referring back to FIG. 3, when the automated avatar is created and logged in, step 100, the queue is maintained by the queuing component 84 and the agent resources controlled by the agent management component 86 are examined and compared to determine the availability level of agents. If there is a high availability, as determined in decision 102, then the control script enters a contact mode of operation, step 104. If, on the other hand, there is a low availability of agents at the present time, the script enters an acquisition mode of control, step 106. (Apart from simple agent availability, the automated avatar may be placed in acquisition mode when it is more advantageous for any other reason for the automated avatar to acquire a benefit than it is for the automated avatar to interact with inhabitants, as indicated previously.)

In the contact mode, step 104, the automated agent is controlled by software component 44 (FIG. 1) to approach an inhabitant, step 108. In practice, the actions guiding the automated avatar at a game level are issued by automated avatar creation and control software component 44 on the game server. The guidance as to what types of action ought to be taken, what parts of the game world ought to be visited, and how the avatar should act, are directed by the scripts 88 which have access to game controls, a game map, and gestures, to give but three examples, stored in a storage area 90 of the contact center 10. Scripts instruct items to be served from storage area 90 to the software component 44 on the game server by setting up a SIP session between SIP BBUA 40 and SIP BBUA 42.

The session initiation protocol deals only with the setup and management of sessions, and not with the details of data passing within such sessions. Accordingly, a proprietary data interface can be created between software component 44 and scripts 88.

Similarly, in step 110, the automated avatar is instructed to begin a conversation with the inhabitant who has been approached. In a rich media virtual environment, the elements of conversation from the automated avatar are served from an announcements and stored media server 92 in the contact center 10. The automated avatar creation and control component 44 is placed into a conference with a media server 94, such that announcements served up from storage area 92 and media server 94 are passed through the appropriate game session 24 (FIG. 1) so that they appear to come from the mouth of the automated avatar. In simpler environments, the automated avatar can deliver text on screen, or can be any other game entity that delivers media.

The automated avatar is programmed to collect information from responses, gestures and other inputs made by the inhabitant to whom it is speaking, step 112. Such information is sent in step 114 to the contact center BBUA 42 which passes it in accordance with scripts 88 to the workflow component of the contact center 82. A contact is generated within the queuing component 84 of the contact center, and the workflow 82 instructs the queuing component 84 how to queue the contact based on the information collected thus far, step 116. As the conversation with the inhabitant develops, the information continues to be collected and passed back to the contact center where the queuing decisions can be refined or changed based on information obtained from the inhabitant.

The automated avatar may be able to complete the interaction in an entirely scripted manner, in which case the conversation will end, step 118. The conversation may also end when the approached inhabitant decides to terminate a conversation. At this point, the contact in the queue may be discarded, step 120. In such a case, the automated avatar will return to step 102, approaching a new inhabitant to begin another conversation.

If the conversation does not end, and an agent becomes available to service the contact, step 124, i.e. the contact reaches the top of the queue, and assuming that the script indicates that agent intervention is appropriate and/or that an agent has been requested by the gamer, the interaction with the inhabitant will be transferred to an agent, step 126, with the process returning to step 102. The agent can be transferred into the interaction by taking control of the avatar such as with a game client, or by being conferenced into the media server so that the agent's inputs, voice, and so on are given the appearance of coming from the automated avatar. This transfer can be seamless or it can be flagged to the user in control of the inhabitant who is in conversation with the automated avatar.

When agent availability is indicated to be low and the automated avatar is controlled in acquisition mode, step 106, the software control of the automated avatar may continue to be carried out by the scripts 88, or it may be entirely carried out by the automated avatar creation and control component 44 which may be programmed to control the avatar in an entirely automated fashion to obtain benefits from the virtual environment and accrue them to the automated avatar on behalf of the contact center.

The nature of such benefits and the ways on which they can be accrued are as varied as the imaginations of game designers and designers of virtual worlds can be. In the simplest and old-fashioned multiplayer games, benefits accrued to a character by travelling through "dungeons", fighting monsters, and collecting treasure. In more varied virtual environments, characters may obtain benefits by talking to other characters, by providing services, by indulging in crafts, by mining, by farming, by participating in financial transactions, and so on. Conceivably, many such interactions with the environment and with the inhabitants populating the environment, can confer benefits and can be automated.

In step 128, an interaction which can confer a benefit is identified (according to the program rules or according to information currently available from the game server).

The automated avatar is controlled in such a manner that it carries out the necessary interaction, step 130, and a benefit is acquired, step 132. The process then returns to step 128, and while in acquisition mode, the automated avatar will typically be controlled so as to maximise benefit or to accrue benefit according to a desired pattern and in accordance with any rules imposed by the game or virtual environment. (At any time, the agent ability level, which is continually checked in the background in step 102 while in acquisition mode, may interrupt this process and transfer the control of the automated avatar into contact mode, step 106.)

It will be appreciated that by having the option of the automated avatar acting in contact mode and in acquisition mode, benefits can accrue to the contact center either directly or indirectly (since an avatar which is successful in acquisition mode will over time become more valuable due to benefits which have been accrued and which may be of value to other players of the game or users of the virtual environment). Accordingly, a contact center might have a stable of such automated avatars accruing benefits. These avatars might become valuable over time or might generate value which can be sold or traded over time, thereby benefiting the contact center.

The avatars can also be assigned to individual agents, and an agent can have a stable of avatars each of which is travelling within the virtual environment. That stable of avatars might never enter acquisition mode, if, while the agent is logged in, the agent can control those avatars to have successful interactions with inhabitants. An agent might be rewarded with a bonus in accordance with the number of avatars who can be kept in "gainful employment" during the agent's working hours. Alternatively, an agent might be rewarded on the basis of the benefit acquired by his or her stable of avatars when the agent is not logged in. Many other possibilities will no doubt suggest themselves to operators of contact centers.

The invention is not limited to the embodiments described herein but can be amended or modified without departing from the scope of the present invention.

We claim:

1. A method of representing a communications session in a virtual environment implemented in a server computer system, comprising the steps of:
 a) said server computer system providing access to said virtual environment to a user employing a user computer system whereby an observation point into said virtual environment at a current location is provided to said user computer system;
 b) receiving at said server computer system a notification of a request for a communications session with said user;
 c) said server computer system generating a presentation entity, said presentation entity being visible and/or audible within said virtual environment and having the

13 ability to present to said user information regarding said request for said communications session;

d) providing said presentation entity at a location within said virtual environment where the presentation entity is visible and/or audible to said user's observation point; and e) controlling the presentation entity to present to said user information regarding said request for said communications session, wherein the presentation entity operates at least part of the time in a contact mode of operation or an acquisition mode of operation, wherein the server computer system is operable to switch the presentation entity between the contact mode and the acquisition mode based on an activity level of the server computer system.

2. A method of representing a communications session in a virtual environment as claimed in claim 1, further comprising the step of making available, to said presentation entity, data relating to said request for said communications session.

3. A method of representing a communications session in a virtual environment as claimed in claim 1, wherein said step (e) comprises executing a script specifying responses to be made by the presentation entity in response to inputs received from said user.

4. A method of representing a communications session in a virtual environment as claimed in claim 1, wherein said observation point is based on a screen view, and wherein said presentation entity is controlled to simulate an ability to interact directly with a physical screen employed by said user.

5. A method of representing a communications session in a virtual environment as claimed in claim 1, wherein said presentation is controlled to provide an option for said user to accept or reject said communications session.

6. A method of representing a communications session in a virtual environment as claimed in claim 5, further comprising the step of notifying the acceptance or rejection of said communications session by said user to a communications system having control of said communications session.

7. A computer program product comprising a data carrier having encoded thereon machine readable instructions which when executed in a server computer system are effective to cause said server computer system to:

a) provide access to a virtual environment to a user employing a user computer system whereby an observation point into said virtual environment at a current location is provided to said user computer system;

b) upon receiving a notification of a request for a communications session with said user, generate a presentation entity, said presentation entity being visible and/or audible within said virtual environment and having the ability to present to said user information regarding said request for said communications session;

c) provide said presentation entity at a location within said virtual environment where the presentation entity is visible and/or audible to said user's observation point; and d) control the presentation entity to present to said user information regarding said request for said communications session, wherein the presentation entity operates at least part of the time in a contact mode of operation or an acquisition mode of operation, wherein the server computer system is operable to switch the presentation entity between the contact mode and the acquisition mode based on an activity level of the server computer system.

8. A server computer system operating a computer program thereon which causes said server computer system to:

a) provide access to a virtual environment to a user employing a user computer system whereby an observation

14 point into said virtual environment at a current location is provided to said user computer system;

b) upon receiving a notification of a request for a communications session with said user, generate a presentation entity, said presentation entity being visible and/or audible within said virtual environment and having the ability to present to said user information regarding said request for said communications session;

c) provide said presentation entity at a location within said virtual environment where the presentation entity is visible and/or audible to said user's observation point; and d) control the presentation entity to present to said user information regarding said request for said communications session, wherein the presentation entity operates at least part of the time in a contact mode of operation or an acquisition mode of operation, wherein the server computer system is operable to switch the presentation entity between the contact mode and the acquisition mode based on an activity level of the server computer system.

9. A method of operating a system comprising a virtual environment implemented in a computerized system and a contact center having an interface with said virtual environment, comprising the steps of:

a) generating within said virtual environment an automated inhabitant associated with said contact center;

b) controlling said automated inhabitant with an automated program causing the automated inhabitant to operate at least part of the time in a contact mode of operation or an acquisition mode of operation, wherein the automated program is operable to switch the automated inhabitant between the contact mode and the acquisition mode based on an activity level of the automated program;

wherein said contact mode of operation comprises:

(i) controlling said automated inhabitant to interact with another inhabitant of the virtual environment, (ii) capturing information from said interaction; and (iii) forwarding said captured information to said contact center;

whereby said contact center may direct a contact relating to said interaction to a resource of said contact center based at least in part on said captured information.

10. A method of operating a system as claimed in claim 9, further comprising the step of queuing, in a queuing system of said contact center, a contact relating to said interaction, said queuing being based at least in part on a decision made on the basis of said captured information.

11. A method as claimed in claim 9, wherein steps (ii) and (iii) of said contact mode of operation are repeated during the course of said interaction, whereby the direction of said contact to a resource may be modified on the basis of updated information.

12. A method as claimed in claim 9, further comprising the step of transferring control of said automated inhabitant to said resource of said contact center.

13. A method as claimed in claim 12, further comprising the step of notifying said other inhabitant of the transfer of control.

14. A method as claimed in claim 9, further comprising the steps, carried out at said contact center, of:

c) receiving an indication of said interaction;

d) creating a contact relating to said interaction;

e) receiving said information captured from said interaction; and f) directing said contact to a resource of said contact center based at least in part on said information.

15. A method as claimed in claim 9, wherein said virtual environment is configured to provide a benefit to an inhabitant thereof when said inhabitant interacts with the environment in a defined manner;
   wherein said acquisition mode of operation comprises:
      (i) controlling said automated inhabitant to interact with said virtual environment in said defined manner in order to acquire said benefit;
whereby said contact center may employ said automated inhabitant to acquire a benefit from said virtual environment when said automated inhabitant is operating in said acquisition mode.

16. A method as claimed in claim 15, wherein said automated inhabitant is operated in said acquisition mode when a resource of said contact center is operating above a defined activity threshold.

17. A method as claimed in claim 15, wherein said automated inhabitant is associated with a human agent of said contact center and the mode of operation of said automated inhabitant is selected based on the actions of said human agent.

18. A method as claimed in claim 17, wherein said actions of said human agent include actions selected by said human agent to directly control the mode of operation of said automated inhabitant.

19. A method as claimed in claim 17, wherein said actions of said human agent include actions performed by said human agent in relation to normal activities of said contact center, and wherein said actions are monitored to automatically control the mode of operation of said automated inhabitant in response thereto.

20. A method as claimed in claim 15, wherein said automated inhabitant is associated with a human agent of said contact center, and wherein said benefit acquired by said automated inhabitant is measured to evaluate a benefit accruing to said human agent.

21. A computer program product comprising a data carrier having encoded thereon machine readable instructions which, when executed in a computerized system comprising a virtual environment and a contact center having an interface with said virtual environment, cause said computerized system to:
   a) generate within said virtual environment an automated inhabitant associated with said contact center;
   b) control said automated inhabitant with an automated program causing the automated inhabitant to operate at least part of the time in a contact mode of operation, based on an activity level of the computerized system;
   wherein said contact mode of operation comprises:
      (i) controlling said automated inhabitant to interact with another inhabitant of the virtual environment,
      (ii) capturing information from said interaction; and
      (iii) forwarding said captured information to said contact center;
   whereby said contact center may direct a contact relating to said interaction to a resource of said contact center based at least in part on said captured information.

22. A computerized system controlling a virtual environment and including a contact center having an interface with said virtual environment, said computerized system operating a computer program thereon which causes said server computer system to:
   a) generate within said virtual environment an automated inhabitant associated with said contact center;
   b) control said automated inhabitant with an automated program causing the automated inhabitant to operate at least part of the time in a contact mode of operation, based on an activity level of the server computer system;
   wherein said contact mode of operation comprises:
      (i) controlling said automated inhabitant to interact with another inhabitant of the virtual environment,
      (ii) capturing information from said interaction; and
      (iii) forwarding said captured information to said contact center;
   whereby said contact center may direct a contact relating to said interaction to a resource of said contact center based at least in part on said captured information.

\* \* \* \* \*